United States Patent
Moriya et al.

(10) Patent No.: US 9,638,860 B2
(45) Date of Patent: May 2, 2017

(54) OPTICAL COUPLING MEMBER AND OPTICAL CONNECTOR USING THE SAME, AND OPTICAL COUPLING MEMBER HOLDING MEMBER

(71) Applicant: MITSUBISHI PENCIL COMPANY, LIMITED, Tokyo (JP)

(72) Inventors: Naohiko Moriya, Yokohama (JP); Kiyoshi Iwamoto, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 2 days.

(21) Appl. No.: 14/351,903

(22) PCT Filed: Oct. 15, 2012

(86) PCT No.: PCT/JP2012/076629
§ 371 (c)(1),
(2) Date: Apr. 15, 2014

(87) PCT Pub. No.: WO2013/058216
PCT Pub. Date: Apr. 25, 2013

(65) Prior Publication Data
US 2014/0301698 A1    Oct. 9, 2014

(30) Foreign Application Priority Data

Oct. 18, 2011    (JP) ................................. 2011-229139

(51) Int. Cl.
| | |
|---|---|
| G02B 6/32 | (2006.01) |
| G02B 6/38 | (2006.01) |
| G02B 6/42 | (2006.01) |

(52) U.S. Cl.
CPC ............. *G02B 6/32* (2013.01); *G02B 6/3853* (2013.01); *G02B 6/4204* (2013.01)

(58) Field of Classification Search
None
See application file for complete search history.

(56) References Cited

U.S. PATENT DOCUMENTS

| | | | |
|---|---|---|---|
| 4,632,505 A | * | 12/1986 | Allsworth ................ G02B 6/32 |
| | | | 385/61 |
| 5,357,590 A | | 10/1994 | Auracher |
| | | (Continued) | |

FOREIGN PATENT DOCUMENTS

| | | |
|---|---|---|
| JP | 60-221713 | 11/1985 |
| JP | 02-281216 A | 11/1990 |
| | (Continued) | |

OTHER PUBLICATIONS

International Search Report for PCT/JP2012/076629, Mailing Date of Nov. 27, 2012.

(Continued)

*Primary Examiner* — John M Bedtelyon
(74) *Attorney, Agent, or Firm* — Westerman, Hattori, Daniels & Adrian, LLP

(57) ABSTRACT

It is an object of the present invention to simply position a lens and an optical fiber while suppressing an increase in cost. An optical coupling member includes an optical fiber (13), a holder (11) that holds the optical fiber (13) inserted from an insertion hole (11a) formed at one end, and a lens such as a collimator lens (12) accommodated in an accommodation section (11c) formed at the other end of the holder (11), in which positioning is performed by causing the lens and/or the end face of the optical fiber (13) to come into contact with a tapered surface provided at a position facing the lens (12) and the optical fiber (13) in a protruding portion (11e) formed on an inner surface in the vicinity of the accommodation section (11c) of the holder (11).

13 Claims, 8 Drawing Sheets

(56) References Cited

U.S. PATENT DOCUMENTS

| | | |
|---|---|---|
| 5,768,458 A | 6/1998 | Ro et al. |
| 7,218,811 B2 | 5/2007 | Shigenaga et al. |
| 7,474,822 B2 | 1/2009 | Kobayashi et al. |
| 2013/0114926 A1 | 5/2013 | Moriya et al. |

FOREIGN PATENT DOCUMENTS

| | | |
|---|---|---|
| JP | 6-160668 A | 11/1992 |
| JP | 06-18741 A | 4/1993 |
| JP | 05-038606 U | 5/1993 |
| JP | 05-196840 A | 8/1993 |
| JP | 07-120642 A | 5/1995 |
| JP | 9-189826 A | 11/1996 |
| JP | 10-160992 A | 6/1998 |
| JP | 2004-4431 A | 1/2004 |
| JP | 2004-317627 A | 11/2004 |
| JP | 2005-077657 A | 3/2005 |
| JP | 2007-225894 A | 9/2007 |
| JP | 2007-241094 A | 9/2007 |
| TW | 201106030 A1 | 2/2011 |
| WO | 2010/019800 A1 | 2/2010 |
| WO | 2011/129229 A1 | 10/2011 |

OTHER PUBLICATIONS

Office Action dated Jun. 16, 2015, issued in counterpart Japanese application No. 2011-229139 (3 pages).
Office Action dated Aug. 25, 2015, issued in counterpart Japan Application No. 2011-229139 (4 pages).
Office Action dated Jul. 14, 2016, issued in counterpart Taiwanese Application No. 101138482. (5 pages).
Office Action dated Jul. 14, 2016, issued in counterpart Taiwanese Application No. 10520864530. (5 pages).
Office Action dated Oct. 9, 2016, issued in counterpart Chinese Application No. 201280051390.4 (5 pages).

\* cited by examiner

OPTICAL COUPLING MEMBER AND OPTICAL CONNECTOR USING THE SAME, AND OPTICAL COUPLING MEMBER HOLDING MEMBER

TECHNICAL FIELD

The present invention relates to an optical coupling member used when light from a light-emitting device is condensed and inputted to an optical fiber or light emitted from an optical fiber is condensed on a light-receiving device, and an optical connector using the optical coupling member and an optical coupling member holding member.

BACKGROUND ART

Optical coupling members are used when light emitted from a light source is made to propagate through an optical fiber and emitted into the air as required or when light propagating through the air is inputted to an optical fiber. In such optical coupling members, it is necessary to appropriately position an end face of the optical fiber and a collimator lens in order to reduce propagation losses. Conventionally, as such a method for positioning the end face of the optical fiber and the collimator lens, a method that inserts a spacer as a separate member into a holding member is known (e.g., see Patent Literature 1).

CITATION LIST

Patent Literature

[Patent Literature 1] Japanese Patent Application Laid-Open No. 2007-241094

SUMMARY OF THE INVENTION

Technical Problem

In recent years, studies are being carried out on the possibility of performing large-volume communication between apparatuses or in an apparatus using an optical fiber. Optical coupling members used for such applications are required to have a small size in the aspect of shape and maintain positional relationships between the optical fiber and lens even when they are inserted and removed repeatedly in the aspect of apparatus.

The method according to Patent Literature 1 may be applied to positioning of the end face of the optical fiber and the collimator lens in such an optical coupling member. However, the smaller the size of the optical collimator, the more difficult it is to insert a spacer as a separate member into the holding member, resulting in a problem that the cost incurred in such an operation increases.

The present invention has been implemented in view of the above-described problems and it is an object of the present invention to provide an optical coupling member, an optical connector using this optical coupling member and an optical coupling member holding member capable of simply positioning a lens and an optical fiber while suppressing an increase in cost.

Solution to Problem

An optical coupling member according to the present invention includes an optical fiber, a holding member that holds the optical fiber inserted from an insertion hole formed at one end, and a lens accommodated in an accommodation section formed at the other end of the holding member, in which positioning is performed by causing the lens and/or the end face of the optical fiber to come into contact with a tapered surface provided at a position opposed to the lens and the optical fiber in a protruding portion formed on an inner surface in the vicinity of the accommodation section of the holding member.

According to the above-described optical coupling member, positioning is performed by causing the lens and/or the end face of the optical fiber to come into contact with a tapered surface provided at a position opposed to the lens and the optical fiber in a protruding portion formed on an inner surface of the holding member, and it is thereby possible to position the lens and/or the optical fiber using the protruding portion as a reference. Compared to a conventional case where a spacer as a separate member is inserted into a holder holding member, it is thereby possible to improve operation efficiency and simply position the lens and the optical fiber while suppressing an increase in cost.

According to the above-described optical coupling member, the protruding portion partly having a tapered surface is provided on the inner surface of the holding member, and it is thereby possible to avoid problems that might occur when providing a protruding portion having an abutting surface orthogonal to the insertion direction of the optical fiber. For example, when a protruding portion having an abutting surface orthogonal to the insertion direction of the optical fiber is provided for a metallic holding member through cutting work, an extremely fine microprocessing technique is required, resulting in a problem that it is difficult to secure dimensional accuracy. Another problem is that burrs are likely to occur during the work and these burrs may block the optical path between the optical fiber and the lens causing adverse influences on propagation. A further problem is that the edge portion is likely to damage the lens and the end face of the optical fiber. Providing the protruding portion partly having a tapered surface on the inner surface of the holding member as in the case of the optical coupling member according to the present invention makes it possible to secure positional accuracy between the lens and the optical fiber while avoiding the above-described problems.

The above-described optical coupling member is preferably provided with the ring-shaped protruding portion disposed on an identical plane orthogonal to the insertion direction of the optical fiber. In this case, since the ring-shaped protruding portion disposed on the identical plane is provided, it is possible to cause the lens and optical fiber to come into contact with the protruding portion at the ring-shaped position respectively, allowing higher accuracy positioning of the lens and/or optical fiber.

In the above-described optical coupling member, a plurality of the protruding portions are preferably provided on the identical plane orthogonal to the insertion direction of the optical fiber. In this case, since the plurality of protruding portions are provided on the identical plane, it is possible to cause the lens and/or optical fiber to come into contact with the protruding portions at the plurality of positions respectively and thereby allow higher accuracy positioning of the lens and/or optical fiber. Furthermore, since spaces formed among the plurality of protruding portions can function as an escape route for the air when the lens and optical fiber are inserted, positioning can be performed smoothly.

In the above-described optical coupling member, an angle of the tapered surface of the protruding portion facing the optical fiber is preferably made different from an angle of the tapered surface of the protruding portion facing the lens with respect to the plane orthogonal to the insertion direction of the optical fiber. Thus, making the angle of the tapered surface of the protruding portion facing the lens different from the angle of the tapered surface facing the optical fiber allows the lens and optical fiber having different shapes to be effectively positioned.

An optical connector of the present invention connects the optical coupling member according to any one of the aforementioned aspects. According to this optical connector, it is possible to obtain the operations and effects achieved by the aforementioned optical coupling member.

An optical coupling member holding member according to the present invention includes a holding body that holds an optical fiber, an accommodation section provided at one end of the holding body for accommodating a lens and an insertion hole provided at the other end of the holding body for inserting the optical fiber, in which positioning is performed by causing the lens and/or the end face of the optical fiber to come into contact with a tapered surface provided at a position opposed to the lens and the optical fiber in a protruding portion formed on an inner surface in the vicinity of the accommodation section of the holding member.

According to the above-described optical coupling member holding member, since positioning is performed by causing the lens and/or the end face of the optical fiber to come into contact with a tapered surface provided at a position opposed to the lens and the optical fiber in a protruding portion formed on an inner surface of the holding body, it is possible to position the lens and/or the optical fiber using the protruding portion as a reference. Compared to a conventional case where a spacer as a separate member is inserted into a holder holding member, it is thereby possible to improve operation efficiency and simply position the lens and the optical fiber while suppressing an increase in cost.

The above-described optical coupling member holding member is preferably provided with the ring-shaped protruding portion disposed on an identical plane orthogonal to the insertion direction of the optical fiber. In this case, since the ring-shaped protruding portion disposed on the identical plane is provided, it is possible to cause the lens and optical fiber to come into contact with the protruding portion at their respective ring-shaped positions, allowing higher accuracy positioning of the lens and/or optical fiber.

In the above-described optical coupling member holding member, a plurality of the protruding portions are preferably provided on the identical plane orthogonal to the insertion direction of the optical fiber. In this case, since the plurality of protruding portions are provided on the identical plane, it is possible to cause the lens and/or optical fiber to come into contact with the protruding portions at the plurality of positions respectively and thereby allow higher accuracy positioning of the lens and/or optical fiber. Furthermore, since spaces formed among the plurality of protruding portions can function as an escape route for the air when the lens and optical fiber are inserted, positioning can be performed smoothly.

In the above-described optical coupling member holding member, the angle of the tapered surface of the protruding portion facing the optical fiber is preferably made different from the angle of the tapered surface of the protruding portion facing the lens with respect to the plane orthogonal to the insertion direction of the optical fiber. Thus, making the angle of the tapered surface of the protruding portion facing the lens different from the angle of the tapered surface facing the optical fiber allows the lens and optical fiber having different shapes to be effectively positioned.

Technical Advantage of the Invention

According to the present invention, it is possible to simply position the lens and the optical fiber while suppressing an increase in cost.

DESCRIPTION OF EMBODIMENTS

Figure 1:
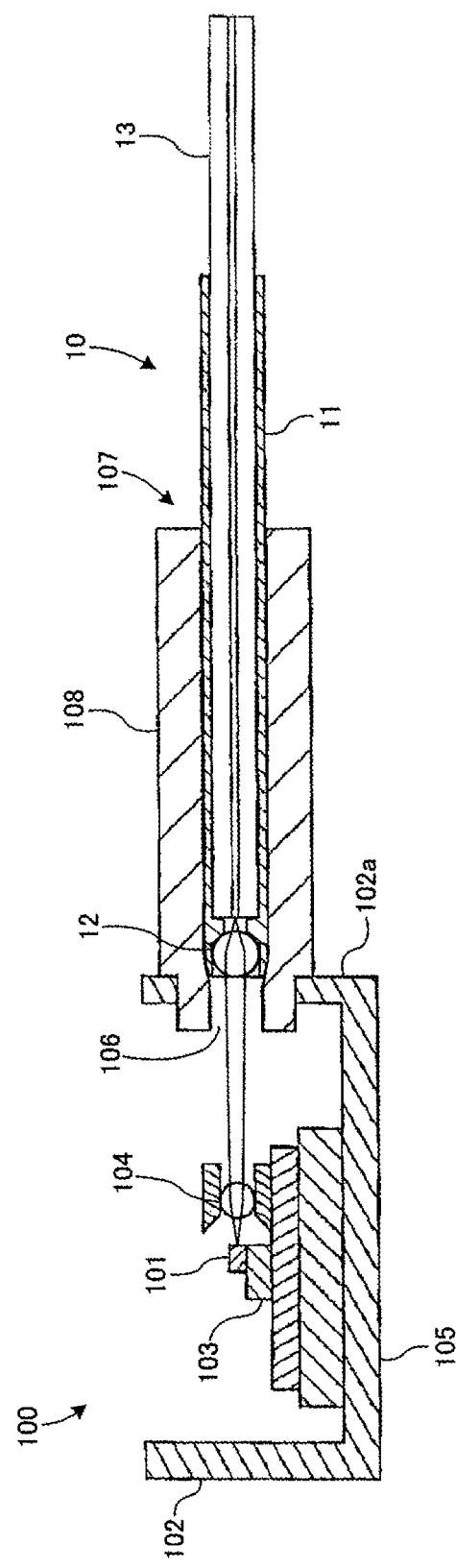
FIG. 1 is a side cross-sectional view schematically illustrating an optical connector to which an optical collimator according to the present invention is connected.

Hereinafter, embodiments of the present invention will be described in detail with reference to the accompanying drawings. First, an optical connector to which an optical collimator as an optical coupling member according to the present invention is connected will be described. FIG. 1 is a cross-sectional side view schematically illustrating an optical connector to which an optical collimator according to the present invention is connected. In FIG. 1, for convenience of description, an optical connector will be described which is provided with a semiconductor laser chip as a light source that emits light to the optical collimator and an optical lens on an optical axis of this semiconductor laser chip. However, the configuration of the optical connector is not limited to this, but various changes can be made as appropriate.

As shown in FIG. 1, an optical connector 100 to which the optical collimator according to the present invention is connected is provided with a semiconductor laser unit 105 configured such that a semiconductor laser chip 101 is placed on a mount base 103 of a case 102 and an optical lens 104 is placed on the optical axis of this semiconductor laser chip 101. The optical connector 100 is also provided with an adapter 108 configured such that an opening 106 is formed in a side face 102a of the case 102 for holding a holder 11 of the optical collimator 10 inserted from an insertion opening 107.

In the semiconductor laser unit 105, laser light emitted from the semiconductor laser chip 101 is transformed into parallel light by the optical lens 104 and guided to the opening 106. The parallel light from the optical lens 104 is condensed by a collimator lens 12 of the optical collimator 10 and inputted to an optical fiber 13. The incident light propagates through the optical fiber 13.

In the optical connector 100 according to the present embodiment, when the optical collimator 10 is inserted up to a predetermined position of the adapter 108, alignment between the optical lens 104 and the collimator lens 12 is performed. The system is designed so that the laser light from the semiconductor laser chip 101 may be appropriately inputted to the optical fiber 13. Hereinafter, the configuration of the optical collimator 10 according to the present embodiment connected to the optical connector 100 will be described.

First Embodiment

Figure 2:
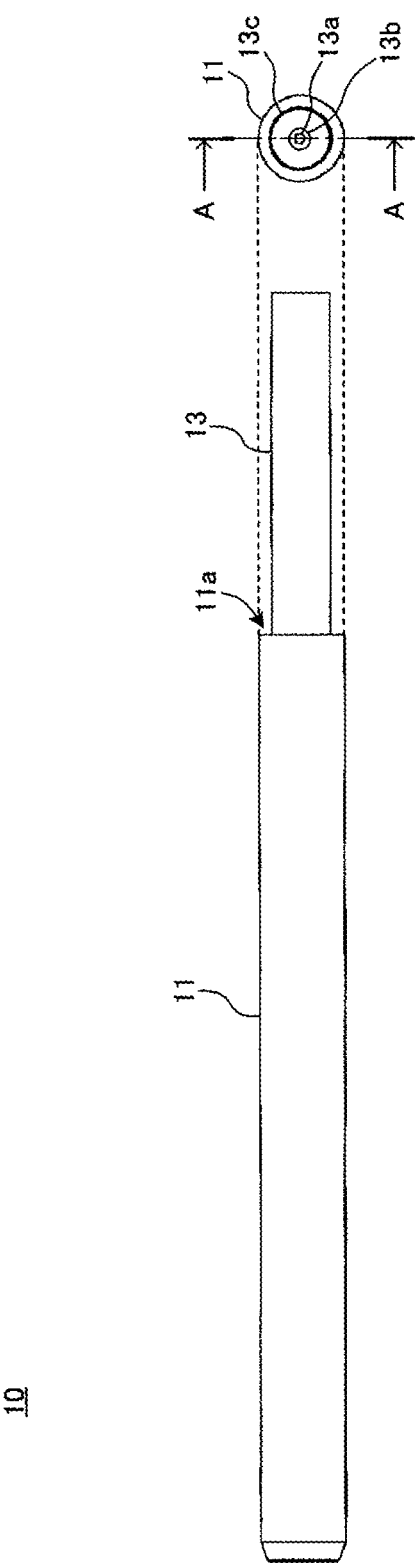
FIG. 2 is a side view of the optical collimator according to a first embodiment of the present invention.
Figure 3:
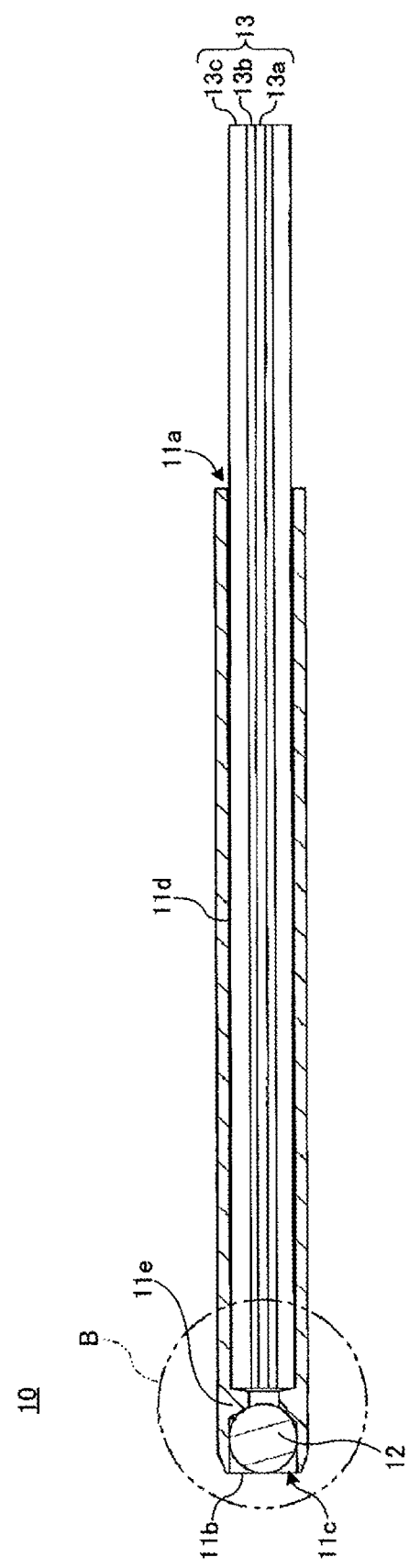
FIG. 3 is a cross-sectional view along A-A shown in FIG. 2.

FIG. 2 is a side view of the optical collimator 10 according to a first embodiment of the present invention. FIG. 3 is a cross-sectional view along A-A shown in FIG. 2. As shown in FIG. 2 and FIG. 3, the optical collimator 10 according to the first embodiment is configured by including a holder 11 as a holding member having a generally cylindrical shape, the collimator lens 12 held at one end of this holder 11, and the optical fiber 13 inserted from an insertion hole 11a provided at the other end of the holder 11. Note that in the optical collimator 10 according to the present embodiment, a plastic optical fiber is preferably inserted as the optical fiber 13.

The holder 11 is formed, for example, of a metal material such as stainless steel. The holder 11 is preferably ferrite-based stainless steel from the standpoint of workability in particular. As shown in FIG. 3, an opening 11b is provided at an end of the holder 11 on the collimator lens 12 side. An accommodation section 11c that accommodates the collimator lens 12 is provided inside this opening 11b. The accommodation section 11c is formed in a size slightly smaller than the diameter of the collimator lens 12 so that the collimator lens 12 can be pressed thereinto. The accommodation section 11c is provided in a size that allows the entire collimator lens 12 to be accommodated therein in order to prevent damage to the surface of the collimator lens 12. Furthermore, a through hole 11d having a slightly larger diameter than the outer diameter of the optical fiber 13 is provided in the holder 11. This through hole 11d is provided so as to communicate with the insertion hole 11a and at the same time communicate with the accommodation section 11c. Moreover, a plurality of protruding portions 11e that protrude inside in a diameter direction of the holder 11 are provided on an inner circumferential surface of the holder 11. These protruding portions 11e are provided between the accommodation section 11c and the through hole 11d, and as will be described in more detail later, these protruding portions 11e are used for positioning of the collimator lens 12 and the optical fiber 13. The protruding portion 11e is ring-shaped and formed on the entire inner circumference of an identical circumference of the holder 11. The holder 11 having such a configuration is formed, for example, by applying cutting to a cylindrical member made of a metal material such as stainless steel.

The collimator lens 12 is formed of, for example, a glass material and comprised of a spherical ball lens. The collimator lens 12 is comprised of a spherical ball lens having an outer diameter of, for example, 0.3 to 1.5 mm. As shown in FIG. 3, the collimator lens 12, when accommodated in the accommodation section 11c of the holder 11, is disposed so as to face the opening 106 of the adapter 108 from the opening 11b and also face the distal end of the optical fiber 13 inserted in the through hole 11d.

The optical fiber 13 is formed of, for example, a plastic optical fiber and configured of a core 13a provided so as to penetrate the center of the optical fiber, a first clad 13b with which the core 13a is coated and a second clad 13c with which the first clad 13b is coated. All of these core 13a and two-layer clad (first clad 13b, second clad 13c) are made of plastic materials. On an end face of the optical fiber 13 opposed to the collimator lens 12, the core 13a, first clad 13b and second clad 13c are arranged on an identical plane. That is, the core 13a, first clad 13b and second clad 13c are arranged uniformly on the end face opposed to the collimator lens 12.

The optical fiber 13 is inserted into the through hole 11d via the insertion hole 11a and is fixed with the distal end portion thereof placed in the vicinity of the collimator lens 12 so as to face the spherical surface thereof. In this case, the optical fiber 13 is fixed to the holder 11 using an adhesive applied between itself and the inner surface of the through hole 11d. The fixing of the optical fiber 13 to the holder 11 is not limited to this but any given fixing method is applicable.

In the optical collimator 10 according to the first embodiment, the optical fiber 13 is configured of, for example, a graded index (GI) type optical fiber and is configured such that its refractive index continuously changes on a cross section perpendicular to the fiber axis. The core 13a and first clad 13b are configured of fully fluorine-substituted optical resin in which H of a C—H bond is substituted by F. As such, the optical fiber 13 configured of fully fluorine-substituted optical resin and also configured of a GI type optical fiber is enabled to achieve high-speed and large-volume communication.

The optical collimator 10 according to the first embodiment configured as described above uses the protruding portion 11e provided in the holder 11 for simple positioning of the collimator lens 12 and the optical fiber 13 while suppressing an increase in cost. To be more specific, positioning is performed by causing parts of the collimator lens 12 and optical fiber 13 to come into contact with the tapered surface provided in part of the protruding portion 11e (more specifically, positions of the protruding portion 11e facing the collimator lens 12 and optical fiber 13) provided in the holder 11. This eliminates the necessity for a configuration of a spacer for positioning of these parts, and can thereby simply perform positioning with the collimator lens 12 and the optical fiber 13 while suppressing an increase in cost.

Figure 4:
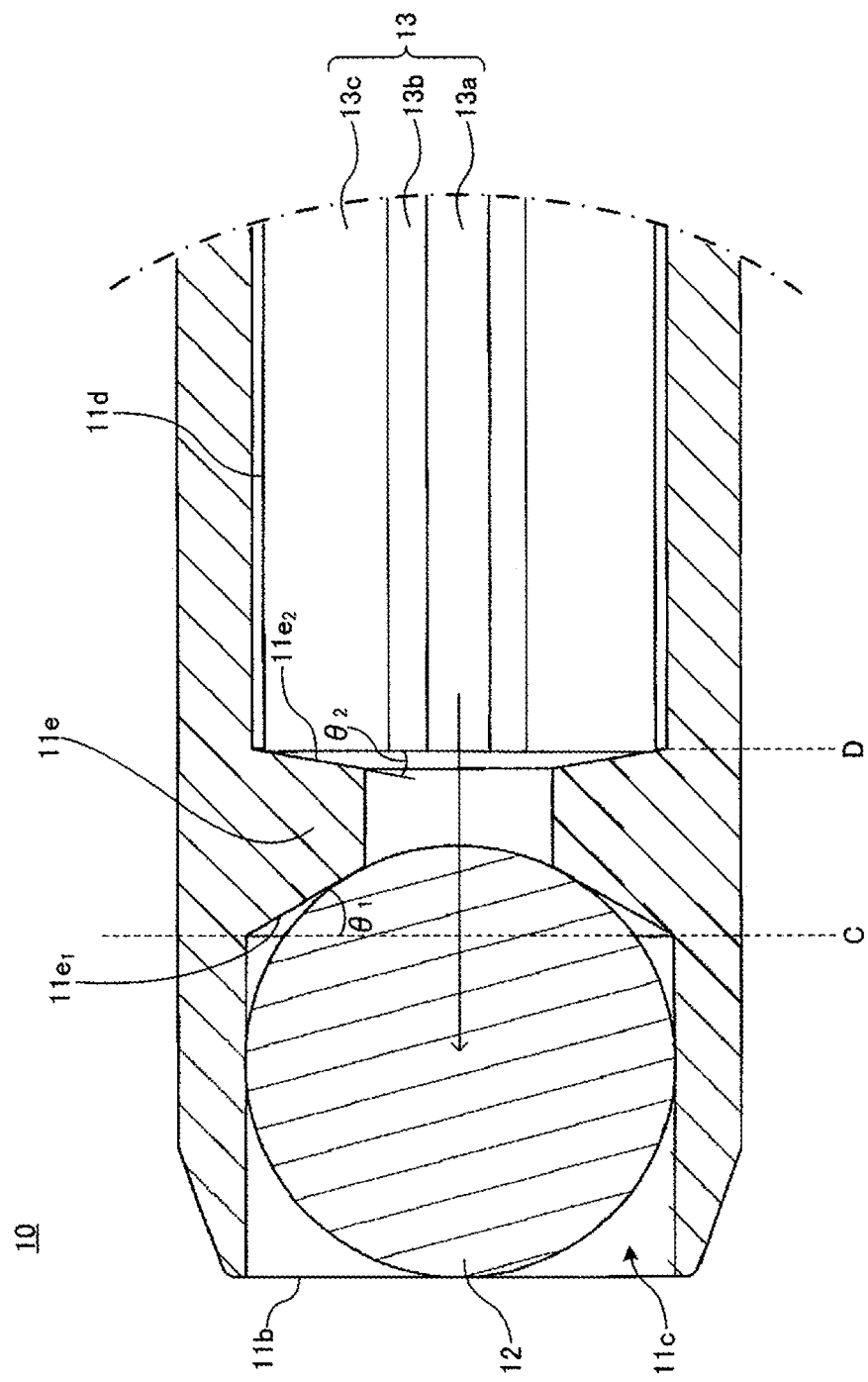
FIG. 4 is an enlarged view inside the two-dot dashed line B shown in FIG. 3.

Here, a method for positioning the collimator lens 12 and optical fiber 13 in the holder 11 of the optical collimator 10 according to the first embodiment will be described using FIG. 4. FIG. 4 is an enlarged view inside the two-dot dashed line B shown in FIG. 3. As shown in FIG. 4, part of the collimator lens 12 comes into contact with a portion of the protruding portion 11e that faces the collimator lens 12, and on the other hand, part of the first clad 13b and/or second clad 13c other than the core 13a making up the optical fiber 13 comes into contact with a portion thereof that faces the optical fiber 13. In such abutting positions, the collimator lens 12 and optical fiber 13 are positioned at their respective predetermined positions in the holder 11.

As shown in FIG. 4, the protruding portion 11e is provided such that an angle of its portion facing the collimator lens 12 with respect to a plane orthogonal to the insertion direction of the optical fiber 13 (e.g., plane C which is disposed parallel to the end face of the optical fiber 13 shown in FIG. 4 and which passes through the center of the protruding portion 11e) is made different from an angle of its portion facing the optical fiber 13. Such protruding portion 11e can be provided by applying cutting in the extending direction of the holder 11 using a tool having a smaller diameter than that of the holder 11. Thus, making the angle of the protruding portion 11e facing the collimator lens 12 different from the angle of the portion facing the optical fiber 13 makes it possible to effectively perform positioning of the collimator lens 12 and the optical fiber 13 which have different shapes.

In the optical collimator 10 according to the first embodiment, such a protruding portion 11e is provided in a ring shape on the same circumference of the holder 11. Providing the ring-shaped protruding portion 11e on the same circumference allows the collimator lens 12 and/or the optical fiber 13 to come into contact at their respective ring-shaped positions, making it possible to perform positioning of the collimator lens 12 and the optical fiber 13 with higher accuracy.

The portion of the protruding portion 11e facing the collimator lens 12 forms a tapered surface $11e_1$. This tapered surface $11e_1$ is provided so that an angle $\theta_1$ with respect to the plane orthogonal to the insertion direction of the optical fiber 13 indicated by an arrow in FIG. 4 (e.g., plane D which is disposed parallel to the end face of the optical fiber 13 shown in FIG. 4 and which passes through the proximal end of the protruding portion 11e) becomes 5° or more and 30° or less. Setting the angle $\theta_1$ of the tapered surface $11e_1$ on the collimator lens 12 side with respect to the plane D orthogonal to the insertion direction of the optical fiber 13 to 5° or more and 30° or less in this way allows positioning with part of the collimator lens 12 on the optical fiber 13 side being supported, and it is thereby possible to increase positional accuracy of the collimator lens 12.

In the optical collimator 10 according to the first embodiment, removal machining through cutting, press work, grinding, or energy beam machining is applied to the surface of the portion of the protruding portion 11e facing the collimator lens 12 to thereby form an abutting surface with the collimator lens 12. Applying removal machining to the surface of the protruding portion 11e opposed to the collimator lens 12 to thereby form an abutting surface with the collimator lens 12 in this way allows the abutting surface with the collimator lens 12 to be smoothed. As a result, it is possible to prevent damage of this collimator lens 12 and also further increase positional accuracy of the collimator lens 12. Such removal machining is likewise performed on optical collimators 20 and 30 according to second and third embodiments shown below.

On the other hand, the portion of the protruding portion 11e facing the optical fiber 13 constitutes a tapered surface $11e_2$. The tapered surface $11e_2$ is provided so that an angle $\theta_2$ with respect to the plane orthogonal to the insertion direction of the optical fiber 13 (e.g., plane D disposed parallel to the end face of the optical fiber 13 shown in FIG. 4) becomes 5° or more and 30° or less. Thus, since the angle of the tapered surface $11e_2$ is provided to be 5° or more and 30° or less with respect to the plane D, when the optical fiber 13 is configured of an optical fiber (e.g., plastic optical fiber) in which the core 13a, first clad 13b and second clad 13c are arranged on the same plane as described above, by causing the end face of the optical fiber 13 to come into contact with the protruding portion 11e, it is possible to more easily secure positional accuracy of these parts.

As described above, in the optical collimator 10 according to the first embodiment, positioning is performed by causing part of the collimator lens 12 and part of the optical fiber 13 to come into contact with the tapered surface provided in part of the protruding portion 11e provided in the holder 11. It is thereby possible to position the collimator lens 12 and the optical fiber 13 using the protruding portion 11e as a reference, and improve operation efficiency compared to a conventional case where a spacer as a separate member is inserted in the holder 11 and simply position the collimator lens 12 and the optical fiber 13 while suppressing an increase in cost.

In the optical collimator 10 according to the first embodiment, the protruding portion 11e partly having tapered surfaces $11e_1$ and $11e_2$ is provided on the inner surface of the holder 11, and it is thereby possible to avoid problems that might occur when providing a protruding portion having an abutting surface orthogonal to the insertion direction of the optical fiber 13. For example, when a protruding portion having an abutting surface orthogonal to the insertion direction of the optical fiber 13 is provided for the metallic holder 11 through cutting work, an extremely fine microprocessing technique is required, resulting in a problem that it is difficult to secure dimensional accuracy. Another problem is that burrs are likely to occur during the work and these burrs may block the optical path between the optical fiber 13 and the collimator lens 12 causing adverse influences on propagation. A further problem is that the edge portion is likely to damage the collimator lens 12 and the end face of the optical fiber 13. Providing the protruding portion 11e partly having tapered surfaces $11e_1$ and $11e_2$ on the inner surface of the holder 11 as in the case of the optical collimator 10 according to the first embodiment makes it possible to secure positional accuracy between the collimator lens 12 and the optical fiber 13 while avoiding the above-described problems.

Furthermore, in the holder 11 of the optical collimator 10 according to the first embodiment, the collimator lens 12 and the optical fiber 13 are positioned using the protruding portion 11e, and on the other hand, the optical fiber 13 is fixed using an adhesive or the like applied between the optical fiber 13 and the inner surface of the through hole 11d. In this case, since the through hole 11d is configured so as to be long enough to fix the optical fiber 13, the positioned optical fiber 13 can be firmly fixed. For this reason, in an application for carrying out large-volume communication between apparatuses or within an apparatus using the optical fiber 13, even when the optical fiber is repeatedly inserted and removed, it is possible to maintain the positional relationship with the optical fiber 13 and the collimator lens 12.

A case has been described above where the collimator lens 12 and the optical fiber 13 are positioned by causing part of the collimator lens 12 and part of the optical fiber 13 to come into contact with the protruding portion 11e provided in the holder 11. However, the method of positioning the collimator lens 12 and the optical fiber 13 is not limited to this, but can be changed as appropriate. For example, instead of causing both the collimator lens 12 and the optical fiber 13 to come into contact with the protruding portion 11e, one of the collimator lens 12 and the optical fiber 13 may be caused to come into contact with protruding portion 11e and the other may be positioned by part of the holder 11 other than the protruding portion 11e. In this case, however, the portion for positioning the other is presupposed to be designed to have a certain positional relationship with the protruding portion 11e. That is, the optical collimator 10 according to the present invention also includes an idea of causing one of the collimator lens 12 and the optical fiber 13 to come into contact with the protruding portion 11e. The aspect of causing one of the collimator lens 12 and the optical fiber 13 to come into contact with the protruding portions 11e is also similar to those of collimators 20 and 30 according to second and third embodiments shown below.

Regarding the optical collimator 10 according to the first embodiment, a case has been described where the holder 11 provided with the protruding portion 11e on the inner surface is formed by applying cutting to the holder 11 made of a metal material. However, the material and method of forming the holder 11 are not limited to this, but can be changed as appropriate. For example, the holder 11 can be formed of a resin material such as plastic or ceramic. To be more specific, the holder 11 may be formed by applying molding to a resin material. In this case, various resin materials may be used for the holder 11, such as polystyrene (PS) resin, polyoxymethylene (POM) resin, ABS resin, polybutylene terephthalate (PBT) resin, polyethylene terephthalate (PET) resin, polyphenylene oxide (PPO) resin, polycarbonate (PC) resin, modified polyphenylene ether (m-PPE) resin, polyether ether ketone (PEEK) resin, polyether imide (PEI) resin. When such a holder 11 is formed, effects similar to those of the holder 11 made of a metal material can be obtained as well.

A case has been described where the optical collimator 10 according to the first embodiment is provided with the optical fiber 13 in which the core 13a and clad (first clad 13b, second clad 13c) are made of plastic materials. However, the configuration of the optical fiber 13 is not limited to this, but optical fibers 13 in other configurations are also applicable. The optical fiber 13 can be made of a hard plastic clad fiber (H-PCF) in which the core 13a is made of quartz glass and the clad is made of high hardness plastic. The same applies to an optical collimator 20 according to a second embodiment which will be described below.

Second Embodiment

An optical collimator according to a second embodiment is different from the optical collimator 10 according to the first embodiment in that the configuration of the protruding portion is different. Hereinafter, the configuration of the optical collimator according to the second embodiment will be described focusing on differences from the optical collimator 10 according to the second embodiment.

Figure 5:
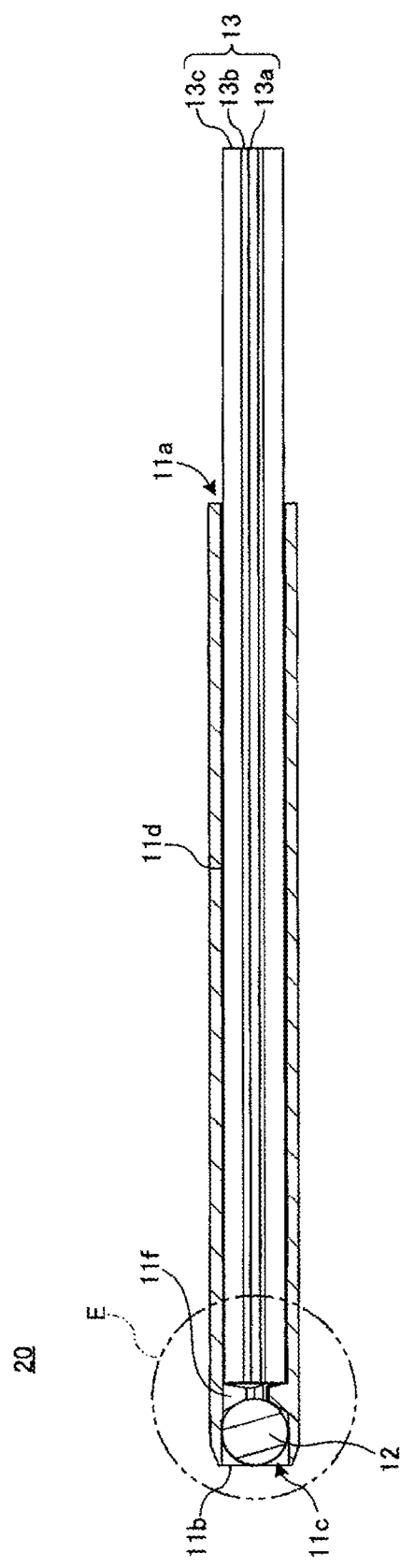
FIG. 5 is a cross-sectional view of an optical collimator according to a second embodiment of the present invention.
Figure 6:
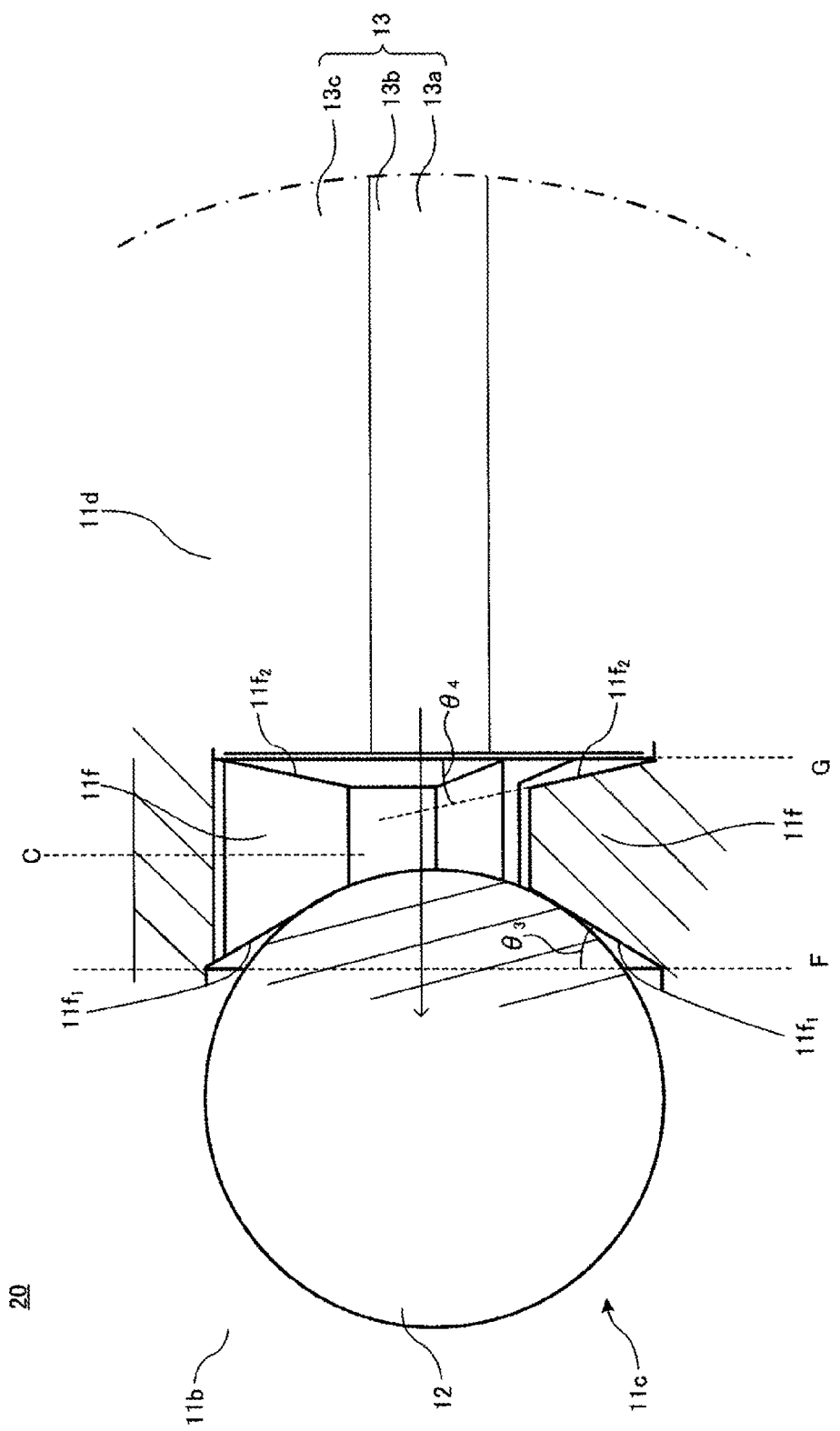
FIG. 6 is an enlarged view inside the two-dot dashed line E shown in FIG. 5.

FIG. 5 is a cross-sectional view of an optical collimator 20 according to the second embodiment of the present invention. FIG. 6 is an enlarged view inside the two-dot dashed line E shown in FIG. 5. Note that the appearance of the optical collimator 20 according to the second embodiment is common to that of the optical collimator 10 according to the first embodiment shown in FIG. 2, and therefore description thereof will be omitted. In FIG. 5 and FIG. 6, components common to those of the optical collimator 10 according to the first embodiment shown in FIG. 3 and FIG. 4 will be assigned the same reference numerals and description thereof will be omitted.

In the optical collimator 20, a plurality of (three in the present embodiment) protruding portions 11f are provided on an identical plane between the accommodation section 11c and the through hole 11d as shown in FIG. 5 and FIG. 6. Since the plurality of protruding portions 11f are provided on the identical plane, it is possible to cause the collimator lens 12 and optical fiber 13 to come into contact with the protruding portions at a plurality of positions respectively, and thereby allow higher accuracy positioning of the collimator lens 12 and optical fiber 13. Furthermore, since spaces formed among the plurality of protruding portions 11f can function as an escape route for the air when the collimator lens 12 and optical fiber 13 are inserted, positioning can be performed smoothly.

Here, a method of positioning the collimator lens 12 and the optical fiber 13 in the holder 11 of the optical collimator 20 having such protruding portions 11f will be described. As shown in FIG. 6, part of the collimator lens 12 comes into contact with portions of the protruding portions 11f facing the collimator lens 12, and on the other hand, parts of the first clad 13b and second clad 13c making up the optical fiber 13 come into contact with portions of the protruding portions 11f facing the optical fiber 13. In such abutting positions, the collimator lens 12 and optical fiber 13 are positioned at their respective predetermined positions in the holder 11.

The portion of the protruding portion 11f facing the collimator lens 12 constitutes a tapered surface $11f_1$. This tapered surface $11f_1$ is provided, like the protruding portion 11e according to the first embodiment, so that an angle $\theta_3$ with respect to the plane orthogonal to the insertion direction of the optical fiber 13 indicated by an arrow in FIG. 6 (e.g., plane F which is disposed parallel to the end face of the optical fiber 13 shown in FIG. 6 and which passes through the proximal end of the protruding portion 11f) becomes 5° or more and 30° or less. Setting the angle $\theta_3$ of the tapered surface $11f_1$ on the collimator lens 12 side with respect to the plane F orthogonal to the insertion direction of the optical fiber 13 to 5° or more and 30° or less in this way allows positioning with part of the collimator lens 12 on the optical fiber 13 side being supported, and it is thereby possible to increase positional accuracy of the collimator lens 12.

On the other hand, the portion of the protruding portion 11f facing the optical fiber 13 constitutes a tapered surface $11f_2$. The tapered surface $11f_2$ is provided, like the protruding portion 11e according to the first embodiment, so that an angle $\theta_4$ with respect to the plane orthogonal to the insertion direction of the optical fiber 13 (e.g., plane G disposed parallel to the end face of the optical fiber 13 shown in FIG. 6) becomes 5° or more and 30° or less. Thus, since the angle of the tapered surface $11f_2$ is provided to be 5° or more and 30° or less with respect to the plane G, when the optical fiber 13 is configured of an optical fiber (e.g., plastic optical fiber) in which the core 13a, first clad 13b and second clad 13c are arranged on the same plane as described above, by causing the end face of the optical fiber 13 to come into contact with the protruding portion 11f, it is possible to more easily secure positional accuracy of these parts. Therefore, if the angle of the protruding portion is 5° or more and 30° or less, it is possible to secure desired positional accuracy.

As described above, in the optical collimator 20 according to the second embodiment, positioning is performed by causing part of the collimator lens 12 and part of the optical fiber 13 to come into contact with the tapered surface provided in part of the protruding portions 11f (to be more specific, positions of the protruding portion 11f facing the collimator lens 12 and optical fiber 13) provided in the holder 11. It is thereby possible to position the collimator lens 12 and the optical fiber 13 using the protruding portion 11f as a reference, and improve operation efficiency compared to a conventional case where a spacer as a separate member is inserted in the holder 11 and simply position the collimator lens 12 and the optical fiber 13 while suppressing an increase in cost.

Note that the optical collimator 20 according to the second embodiment is similar to the optical collimator 10 according to the first embodiment in that the angle of the portion of the protruding portion 11f facing the collimator lens 12 is different from the angle of the portion facing the optical fiber 13. Therefore, the optical collimator 20 according to the second embodiment can also obtain the effects by the configuration of the protruding portion 11f.

Furthermore, the optical collimator 20 according to the second embodiment is similar to the optical collimator 10 according to the first embodiment in that the protruding portion 11f partly having the tapered surfaces $11f_1$ and $11f_2$ is provided on the inner surface of the holder 11. Therefore, the optical collimator 20 according to the second embodiment can also avoid problems that might occur when providing a protruding portion having an abutting surface orthogonal to the insertion direction of the optical fiber 13.

Third Embodiment

An optical collimator according to a third embodiment is different from the optical collimator 10 according to the first embodiment in the configuration of the optical fiber inserted therein and the shape of the protruding portion for positioning this optical fiber according to the configuration thereof. Hereinafter, the configuration of the optical collimator according to the third embodiment will be described focusing on differences from the optical collimator 10 according to the first embodiment.

Figure 7:
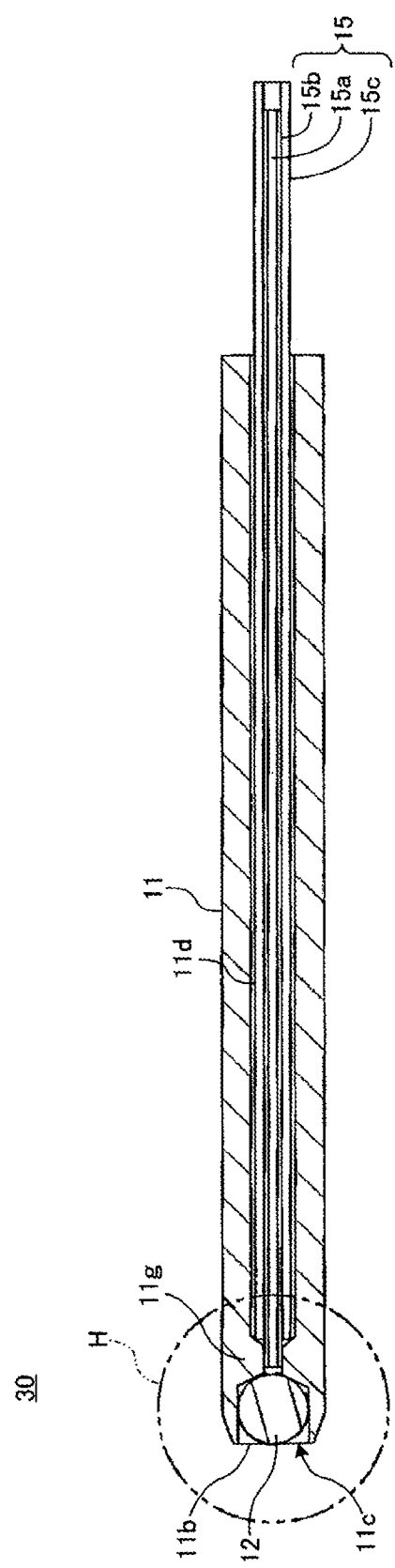
FIG. 7 is a cross-sectional view of an optical collimator according to a third embodiment of the present invention.
Figure 8:
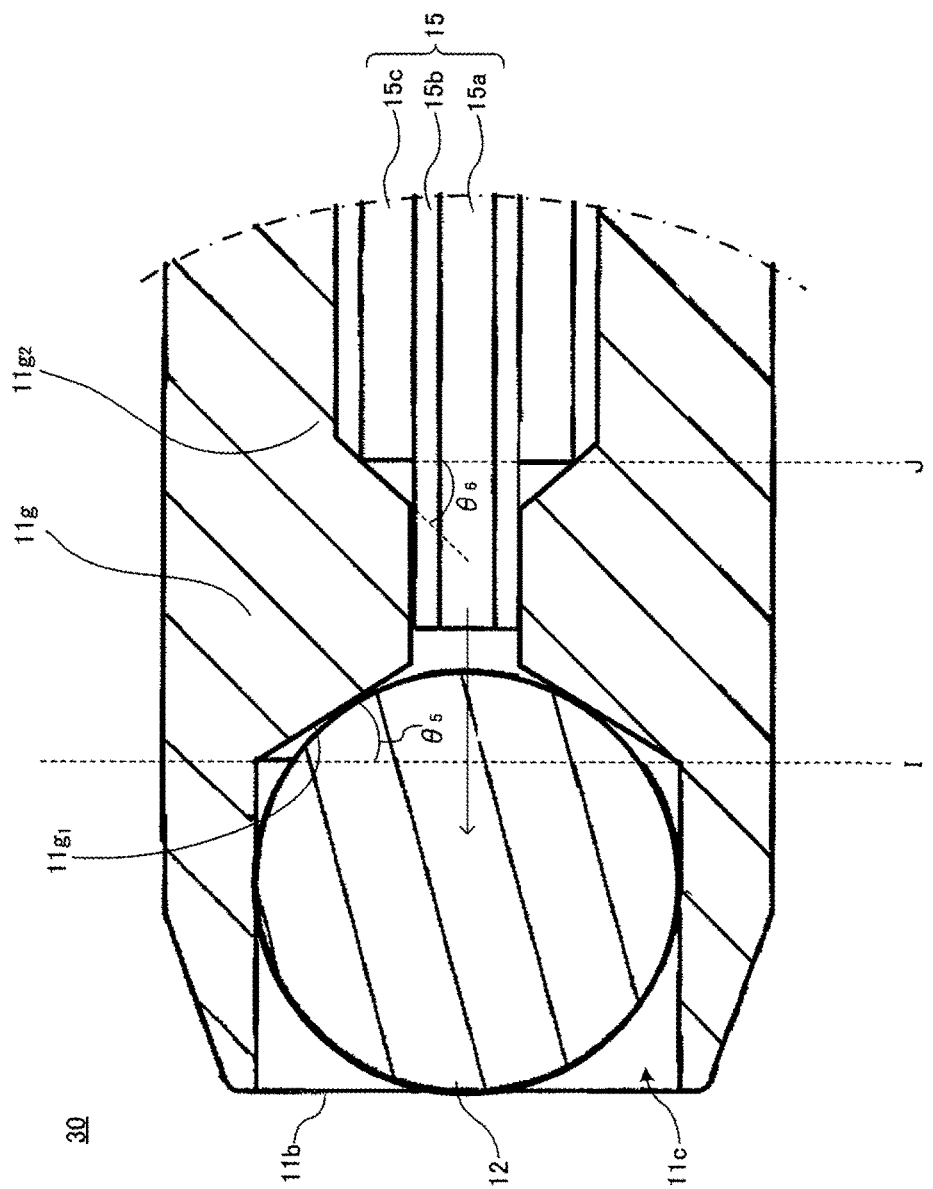
FIG. 8 is an enlarged view inside the two-dot dashed line H shown in FIG. 7.

FIG. 7 is a cross-sectional view of an optical collimator 30 according to the third embodiment of the present invention. FIG. 8 is an enlarged view inside the two-dot dashed line H shown in FIG. 7. Note that the appearance of the optical collimator 30 according to the third embodiment is common to that of the optical collimator 10 according to the first embodiment shown in FIG. 2, and therefore description thereof will be omitted. In FIG. 7 and FIG. 8, components common to those of the optical collimator 10 according to the first embodiment shown in FIG. 3 and FIG. 4 will be assigned the same reference numerals and description thereof will be omitted.

An optical fiber 15 inserted in the optical collimator 30 according to the third embodiment is formed of, for example, a glass optical fiber and configured of a core 15a provided so as to penetrate the center of the optical fiber, a first clad 15b with which the core 15a is coated and a second clad 15c with which the first clad 15b is coated. All of these core 15a and two-layer clad (first clad 15b, second clad 15c) are made of glass materials.

As shown in FIG. 7 and FIG. 8, in the optical fiber 15, coating of the second clad 15c is removed on an end face thereof facing the collimator lens 12 with the first clad 15b and core 15a protruding on the collimator lens 12 side. That is, on the end face facing the collimator lens 12, the core 15a and first clad 15b protrude on the collimator lens 12 side compared to the end face made up of the second clad 15c.

A protruding portion 11g for positioning the collimator lens 12 and optical fiber 15 is provided between the accommodation section 11c and the through hole 11d in the holder 11. The protruding portion 11g has a shape different from that of the protruding portion 11e according to the first embodiment in accordance with the configuration of the aforementioned optical fiber 15. To be more specific, the protruding portion 11g is different in the shape of the portion facing the optical fiber 15 from the protruding portion 11e according to the first embodiment. The shape of this protruding portion 11g will be described later.

Here, a method of positioning the collimator lens 12 and the optical fiber 15 in the holder 11 of the optical collimator 30 having such a protruding portion 11g will be described. As shown in FIG. 8, part of the collimator lens 12 comes into contact with a portion of the protruding portion 11g facing the collimator lens 12, and on the other hand, part of the second clad 15c making up the optical fiber 15 comes into contact with a portion thereof facing the optical fiber 15. In this case, the core 15a and first clad 15b are arranged so as to protrude on the collimator lens 12 compared to an abutting position with the protruding portion 11g. The collimator lens 12 and optical fiber 15 abutting to each other in this way are respectively positioned at predetermined positions of the holder 11.

As shown in FIG. 8, the portion of the protruding portion 11g facing the collimator lens 12 constitutes a tapered surface $11g_1$. This tapered surface $11g_1$ has a configuration similar to that of the tapered surface $11e_1$ of the protruding portions 11e according to the first embodiment and is provided so that an angle $\theta_5$ with respect to the plane orthogonal to the insertion direction of the optical fiber 15 indicated by an arrow in FIG. 8 (e.g., plane I which is disposed parallel to the end face of the optical fiber 15 shown in FIG. 8 and which passes through the proximal end of the protruding portion 11g) becomes 5° or more and 30° or less. Setting the angle $\theta_5$ of the tapered surface $11g_1$ on the collimator lens 12 side with respect to the plane I orthogonal to the insertion direction of the optical fiber 15 to 5° or more and 30° or less in this way allows positioning with part of the collimator lens 12 on the optical fiber 15 side being supported, and it is thereby possible to increase positional accuracy of the collimator lens 12.

On the other hand, the portion of the protruding portion 11g facing the optical fiber 15 constitutes a tapered surface $11g_2$. The tapered surface $11g_2$ is provided so that an angle $\theta_6$ with respect to the plane orthogonal to the insertion direction of the optical fiber 15 (e.g., plane J disposed parallel to the end face of the second clad 15c of the optical fiber 15 shown in FIG. 8) becomes 30° or more and 80° or less. Thus, since the angle of the protruding portion 11g facing the optical fiber 15 is provided to be 30° or more and 80° or less with respect to the plane J orthogonal to the insertion direction of the optical fiber 15, when the optical fiber 15 is configured, as described above, of the core 15a, first clad 15b and second clad 15c, and is configured of an optical fiber (e.g., glass optical fiber) in which the core 15a and the first clad 15b are arranged so as to protrude from the plane of the second clad 15c, it is possible to smoothly insert the optical fiber 15 and also more easily secure positional accuracy of the collimator lens 12 and the optical fiber 15.

As described above, in the optical collimator 30 according to the third embodiment, positioning is performed by causing part of the collimator lens 12 and part of the optical fiber 15 to come into contact with part of the protruding portion 11g (to be more specific, positions of the protruding portion 11g facing the collimator lens 12 and the optical fiber 15) provided in the holder 11. It is thereby possible to position the collimator lens 12 and the optical fiber 15 using the protruding portion 11g as a reference, and improve operation efficiency compared to a conventional case where a spacer as a separate member is inserted in the holder 11 and simply position the collimator lens 12 and the optical fiber 15 while suppressing an increase in cost.

Note that the optical collimator 30 according to the third embodiment is similar to the optical collimator 10 according to the first embodiment in that the angle of the portion of the protruding portion 11g facing the collimator lens 12 is different from the angle of the portion facing the optical fiber 15 and that the protruding portion 11g is provided in a ring shape on the same circumference of the holder 11. Therefore, the optical collimator 30 according to the third embodiment can also obtain the effects by the configuration of the protruding portion 11g.

Furthermore, the optical collimator 30 according to the third embodiment is similar to the optical collimator 10 according to the first embodiment in that the protruding portion 11g partly having the tapered surfaces $11g_1$ and $11g_2$ is provided on the inner surface of the holder 11. Therefore, the optical collimator 30 according to the third embodiment can also avoid problems that might occur when providing a protruding portion having an abutting surface orthogonal to the insertion direction of the optical fiber 15.

Moreover, although the glass optical fiber has been described as an example of the optical fiber 15 in the above-described third embodiment, the optical fiber 15 applied to the optical collimator 30 according to the third embodiment is not limited to the glass optical fiber. For example, a plastic optical fiber may also be applicable for a configuration in which part of the end face on the collimator lens 12 side is disposed so as to protrude. For example, such a plastic optical fiber may be applicable to a case where a coating layer with which the circumference of a clad is coated is formed and only the core and clad are disposed so as to protrude from the end face of the coating layer.

Note that the present invention is not limited to the above-described embodiments but can be implemented modified in various ways. In the above-described embodiments, sizes and shapes or the like are not limited to those shown in the accompanying drawings, but can be changed as appropriate within a range in which the effects of the present invention can be exerted. The present invention can be implemented modified in other aspects as appropriate without departing from the scope of the object of the present invention.

As an example of the optical coupling member, the above-described embodiments have described the optical collimator 10 (20, 30) that condenses parallel light, inputs the condensed light to the optical fiber or transforms light emitted from the optical fiber into parallel light. However, the optical coupling member according to the present invention is not limited to the optical collimator. The optical coupling member according to the present invention is applicable to an optical coupling member in any given configuration on condition that light from a light-emitting device is condensed and impinged on an optical fiber or light emitted from an optical fiber is condensed to a light-receiving device.

Furthermore, although a case has been described in the above-described embodiments where the collimator lens 12 provided for the optical collimator 10 (20, 30) is configured of a glass material, the configuration of the collimator lens 12 is not limited to this, but can be changed as appropriate. For example, the collimator lens 12 may be configured of a plastic material and the shape thereof is not limited to a spherical lens either.

Moreover, although a case has been described in the above-described embodiments where the holder 11 has a generally cylindrical shape, the configuration of the holder 11 is not limited to the cylindrical shape, but can be changed as appropriate. Any given shape may be adopted on condition that the accommodation section 11c of the collimator lens 12 is formed at one end portion, and on the other hand, the insertion hole of the optical fiber 13 is formed at the other end portion. For example, a rectangular cylindrical shape (that is, cylindrical shape whose cross section orthogonal to the insertion direction of the optical fiber 13 is rectangular) may be included therein.

If, for example, the rectangular cylindrical holder 11 is applied to the optical collimator 10 according to the first embodiment, the protruding portion 11e is provided in a ring shape disposed on the same plane orthogonal to the insertion direction of the optical fiber 13 on the inner surface of the holder 11. The same applies to the protruding portion 11g when applied to the optical collimator 30 according to the third embodiment. When the rectangular cylindrical holder 11 is applied to the optical collimator 20 according to the second embodiment, a plurality of the protruding portions 11f are provided on the same plane orthogonal to the insertion direction of the optical fiber 13 on the inner surface of the holder 11.

Moreover, a case has been described in the above-described embodiments where the present invention is embodied as the optical collimator 10 (20, 30) and the optical connector connected thereto. However, the present invention is not limited to these cases, and the present invention is also applicable as an optical coupling member holding member made up of the holder 11 included in the above-described optical collimator 10 (20, 30). In this case, the optical coupling member holding member is provided with, for example, a holding body configured of the entire holder 11, the accommodation section 11c provided at one end of the holding body to accommodate the lens (e.g., collimator lens 12 in the case of the optical collimator holding member), the insertion hole 11a provided at the other end of the holding body to insert the optical fiber 13 (15), and tapered surfaces $11e_1$ and $11e_2$ (tapered surfaces $11f_1$ and $11f_2$, tapered surfaces $11g_1$ and $11g_2$) formed in the vicinity of the accommodation section 11c by providing the protruding portions 11e (11f, 11g) formed on the inner surface in the vicinity of the accommodation section 11c of the holding body.

The optical coupling member holding member according to the present invention provides the tapered surfaces $11e_1$ and $11e_2$ (tapered surfaces $11f_1$ and $11f_2$, tapered surfaces $11g_1$ and $11g_2$) for performing positioning by causing at least one of the lens and the optical fiber 13 (15) to come into contact with part of the protruding portion 11e (11f, 11g) provided in the vicinity of the accommodation section 11c, and can thereby position the lens and/or the optical fiber 13 (15) using the protruding portion 11e (11f, 11g) as a reference. This makes it possible to improve operation efficiency compared to a conventional case where a spacer as a separate member is inserted in the holding member. As a result, it is possible to simply position the lens and the optical fiber 13 (15) while suppressing an increase in cost.

The present application is based on Japanese Patent Application No. 2011-229139 filed on Oct. 18, 2011, entire content of which is expressly incorporated by reference herein.

The invention claimed is:

1. An optical coupling member comprising:
    an optical fiber having an end face;
    a holding member having a protruding portion and a holding portion that holds the optical fiber inserted at an insertion hole formed at one end of the holding member; and
    a lens accommodated in an accommodation section formed at the other end of the holding member,
    wherein the protruding portion is formed on an inner surface of the holding member in the vicinity of the accommodation section thereof, the protruding portion and the holding portion constituting a single component,
    wherein the protruding portion includes a first tapered surface provided at a position facing the lens, and a second tapered surface provided on the opposite side of the protruding portion with respect to the first tapered surface and disposed at a position facing the optical fiber, and
    wherein the optical fiber and the lens are arranged so that positioning of at least the optical fiber is carried out by bringing the end face of the optical fiber into contact with the second tapered surface of the protruding portion.

2. The optical coupling member according to claim 1, wherein the protruding portion is ring-shaped and is provided disposed on an identical plane orthogonal to the insertion direction of the optical fiber.

3. The optical coupling member according to claim 1, wherein a plurality of the protruding portions are provided on an identical plane orthogonal to the insertion direction of the optical fiber.

4. The optical coupling member according to claim 3, wherein the plurality of the protruding portions form an air escape route.

5. The optical coupling member according to claim 1, wherein an angle of the second tapered surface of the protruding portion facing the optical fiber is made different from an angle of the first tapered surface of the protruding portion facing the lens with respect to the plane orthogonal to the insertion direction of the optical fiber.

6. An optical connector comprising the optical coupling member according to claim 1.

7. The optical coupling member according to claim 1, wherein the optical fiber is comprised of a plastic optical fiber,
wherein the second tapered surface is provided at an angle having a range from 5° through 30° with respect to a plane that is orthogonal to the insertion direction of the optical fiber.

8. An optical coupling member holding member comprising:
a holding body having a protruding portion and a holding portion that holds the optical fiber inserted at an insertion hole formed at one end of the holding body;
an accommodation section provided at one end of the holding body for accommodating a lens;
an insertion hole provided at the other end of the holding body for inserting the optical fiber,
wherein the protruding portion is formed on an inner surface of the holding member in the vicinity of the accommodation section thereof, the protruding portion and the holding portion constituting a single component,
wherein the protruding portion includes a first tapered surface provided at a position facing the lens, and a second tapered surface provided on the opposite side of the protruding portion with respect to the first tapered surface and disposed at a position facing the optical fiber, and
wherein the optical fiber and the lens are arranged so that positioning of at least the optical fiber is carried out by bringing the end face of the optical fiber into contact with the second tapered surface of the protruding portion.

9. The optical coupling member holding member according to claim 8, wherein the protruding portion is ring-shaped and is provided disposed on an identical plane orthogonal to the insertion direction of the optical fiber.

10. The optical coupling member holding member according to claim 8, wherein a plurality of the protruding portions are provided on an identical plane orthogonal to the insertion direction of the optical fiber.

11. The optical coupling member holding member according to claim 10, wherein the plurality of the protruding portions form an air escape route.

12. The optical coupling member holding member according to claim 8, wherein an angle of the second tapered surface of the protruding portion facing the optical fiber is made different from an angle of the first tapered surface of the protruding portion facing the lens with respect to the plane orthogonal to the insertion direction of the optical fiber.

13. The optical coupling member holding member according to claim 8, wherein the optical fiber is comprised of a plastic optical fiber,
wherein the second tapered surface is provided at an angle having a range from 5° through 30° with respect to a plane that is orthogonal to the insertion direction of the optical fiber.

\* \* \* \* \*